(12) United States Patent
Benahmed et al.

(10) Patent No.: US 11,092,547 B2
(45) Date of Patent: Aug. 17, 2021

(54) DEVICE AND METHOD FOR OBSERVING A FLUORESCENT SAMPLE

(71) Applicant: Commissariat a l'Energie Atomique et aux Energies Alternatives, Paris (FR)

(72) Inventors: Selimen Benahmed, Grenoble (FR); Cedric Allier, Grenoble (FR); Salim Boutami, Grenoble (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 0 days.

(21) Appl. No.: 16/899,804

(22) Filed: Jun. 12, 2020

(65) Prior Publication Data
US 2020/0393375 A1    Dec. 17, 2020

(30) Foreign Application Priority Data

Jun. 14, 2019   (FR) ...................... 19 06426

(51) Int. Cl.
*G01N 21/64*    (2006.01)
(52) U.S. Cl.
CPC ..... *G01N 21/64* (2013.01); *G01N 2021/6419* (2013.01)
(58) Field of Classification Search
CPC ........... G01N 21/64; G01N 2021/6419; G01N 21/645; G01N 21/7743; G02B 1/005
See application file for complete search history.

(56) References Cited

U.S. PATENT DOCUMENTS

| 2008/0278722 A1* | 11/2008 | Cunningham ....... G01N 33/582 356/317 |
| 2011/0031409 A1 | 2/2011 | Cunningham et al. |
| 2017/0082975 A1* | 3/2017 | Gliere .................... G01N 21/41 |

FOREIGN PATENT DOCUMENTS

| FR | 3 041 474 A1 | 3/2017 |
| JP | 2014-115553 A | 6/2014 |
| WO | WO 2008/136812 A2 | 11/2008 |

OTHER PUBLICATIONS

French Preliminary Search Report dated Feb. 7, 2020 in French Application 19 06426 filed on Jun. 14, 2019 (with Written Opinion & English Translation of Categories of Cited Documents), 12 pages.

* cited by examiner

*Primary Examiner* — David P Porta
*Assistant Examiner* — Meenakshi S Sahu
(74) *Attorney, Agent, or Firm* — Oblon, McClelland, Maier & Neustadt, L.L.P.

(57) ABSTRACT

A method for observing a fluorescent sample, the sample comprising a fluorescent agent that emits fluorescence light, in a fluorescence spectral band, when it is illuminated by excitation light, in an excitation spectral band, the method comprising the following steps:
a) placing the sample on a holder;
b) illuminating the sample, with an excitation light source, in the excitation spectral band, the light emitted by the light source propagating along a propagation axis;
c) detecting fluorescence light, in the fluorescence spectral band, with an image sensor;
the method being such that the holder comprises a thin layer formed from a first material, of a first refractive index, the thin layer lying in a holder plane perpendicular to the propagation axis, the thin layer comprising a first photonic crystal and second photonic crystals configured to confine the excitation light and the fluorescence light in the thin layer.

18 Claims, 11 Drawing Sheets

DEVICE AND METHOD FOR OBSERVING A FLUORESCENT SAMPLE

TECHNICAL FIELD

The technical field of the invention is a device and method for observing a fluorescent sample, having a high sensitivity. The sample may notably be a biological sample.

PRIOR ART

The application of microscopy to fluorescent samples is a very commonplace observation technique, in particular in the field of biology or of medical diagnostics. In this technique, the sample is placed in an object plane of an objective, which is optically coupled to an image sensor. The sample is illuminated at an excitation wavelength, inducing a fluorescence of the sample, so as to form a fluorescence image.

One of the difficulties associated with fluorescence imaging is sensitivity. Specifically, the efficiency of fluorescence, i.e. the intensity of the fluorescence light emitted normalized by the intensity of the excitation light, is generally low. Use of objectives having high magnifications is one way of improving the collection of fluorescence light. However, the higher the magnification, the smaller the field of observation. When a sample of several tens of mm$^2$ must be analyzed, it is necessary to scan the sample, this taking time and requiring suitable instrumentation.

It is known that lensless imaging allows an image of a sample to be formed with large fields of observation. In such a configuration, no image-forming optics are interposed between the sample and the image sensor. When the sample is close to the image sensor, the observed field is slightly smaller than the area of the image sensor. Thus, it is possible to obtain a field of observation reaching several tens of mm$^2$. However, the absence of magnifying optics between the image sensor and the sample makes it difficult to envision using the lensless imaging technique in applications related to fluorescence imaging, because the sensitivity obtained is unsatisfactory.

The inventors have designed a device and method for observing a fluorescent sample, allowing an image representative of the fluorescence of a sample to be obtained with a high sensitivity.

SUMMARY OF THE INVENTION

A first subject of the invention is a method for observing a fluorescent sample, the sample comprising a fluorescent agent that emits fluorescence light, in a fluorescence spectral band, when it is illuminated by excitation light, in an excitation spectral band, the method comprising the following steps:
a) placing the sample against a holder, and preferably in contact with the holder;
b) illuminating the sample, with a light source, in the excitation spectral band, the light emitted by the light source propagating along a propagation axis;
c) detecting fluorescence light, in the fluorescence spectral band, with an image sensor,
the method being such that the holder comprises a thin layer formed from a first material, of a first refractive index, the thin layer lying in a holder plane perpendicular to the propagation axis, the holder plane extending along a longitudinal axis, the thin layer comprising:

first inclusions formed from a second material, of a second refractive index different from the first refractive index, the first inclusions defining a first periodic pattern, the first inclusions being distributed with a first period, parallel to the longitudinal axis, the first inclusions forming a first photonic crystal that is resonant in the excitation spectral band;

second inclusions formed from a third material, of a third refractive index different from the first refractive index, and forming a second periodic pattern, the second inclusions being distributed with a second period, parallel to the longitudinal axis, the second period being strictly longer than the first period, the second inclusions forming a second photonic crystal that is resonant in the fluorescence spectral band;

at least two second photonic crystals being placed on either side of a first photonic crystal;

such that:
some of the light emitted by the light source, at the excitation wavelength, is confined in the thin layer, by the first photonic crystal, resulting in an amplification of a light wave that propagates at an interface between the thin layer and the sample;

the fluorescence light propagates in the thin layer, through a first photonic crystal, while being reflected by the second photonic crystals placed on either side of the first photonic crystal, resulting in an amplification of the fluorescence light.

Thus, along the longitudinal axis, at least one first photonic crystal is bounded by two second photonic crystals, respectively lying on either side of the first photonic crystal, or on either side of each first photonic crystal.

The image formed by the image sensor allows fluorescent portions of the sample to be located in a detection plane defined by the image sensor. This plane contains bright regions, corresponding to the fluorescent portions of the sample.

Preferably, the sample is placed in contact with the thin layer, or at a distance from the latter smaller than 1 mm.

According to one embodiment,
the first photonic crystal is one-dimensional, the first inclusions extending parallel to a lateral axis perpendicular to the longitudinal axis;
and/or the second photonic crystal is one-dimensional, the second inclusions extending parallel to the lateral axis.

According to one embodiment,
the first photonic crystal is two-dimensional, the first inclusions being spaced apart from one another, along a lateral axis perpendicular to the longitudinal axis;
and/or the second photonic crystal is two-dimensional, the second inclusions being spaced apart from one another, along the lateral axis.

The first period, parallel to the longitudinal axis, may be comprised between 100 nm and 300 nm, or between 200 nm and 300 nm. The second period, parallel to the longitudinal axis, may be comprised between 200 nm and 400 nm, or between 300 nm and 400 nm. The thickness of the thin layer, along the propagation axis, may be comprised between 100 nm and 300 nm.

The holder is preferably placed between the sample and the image sensor.

According to one embodiment, no image-forming optics, for example such as lenses or objectives, are placed between the image sensor and the holder. According to another embodiment, an optical system, such as a lens or objective, allows the thin layer to be conjugated with the image sensor.

The third material, forming the second inclusions, may be identical to the second material, forming the first inclusions.

A second subject of the invention is a device for observing a fluorescent sample, the sample comprising a fluorescent agent that emits fluorescence light, in a fluorescence spectral band, when it is illuminated by excitation light, in an excitation spectral band, the device comprising:

- a light source, configured to emit an illuminating light wave in the excitation spectral band, the light propagating, toward the sample, along a propagation axis;
- a sample holder, configured to receive the sample;
- an image sensor, configured to detect fluorescence light, emitted by the sample, in the fluorescence spectral band;

the device being such that:

the holder comprises a thin layer formed from a first material, of a first refractive index, the thin layer lying in a holder plane perpendicular to the propagation axis, the holder plane extending along a longitudinal axis, the thin layer comprising:

- first inclusions formed from a second material, of a second refractive index different from the first refractive index, the first inclusions defining a first periodic pattern, the first inclusions being distributed with a first period, parallel to the longitudinal axis, the first inclusions forming a first photonic crystal that is resonant in the excitation spectral band, the first photonic crystal being configured to confine a portion of the illumination light wave in the thin layer;
- second inclusions formed from a third material, of a third refractive index different from the first refractive index, and forming a second periodic pattern, the second inclusions being distributed with a second period, parallel to the longitudinal axis, the second period being strictly longer than the first period, the second inclusions forming a second photonic crystal that is resonant in the fluorescence spectral band;
- at least two second photonic crystals being placed on either side of a first photonic crystal.

According to one embodiment, the first photonic crystal is one-dimensional, the first inclusions extending parallel to a lateral axis perpendicular to the longitudinal axis;

and/or the second photonic crystal is one-dimensional, the second inclusions extending parallel to the lateral axis.

According to one embodiment, the first photonic crystal is two-dimensional, the first inclusions being spaced apart from one another, along a lateral axis perpendicular to the longitudinal axis;

and/or the second photonic crystal is two-dimensional, the second inclusions being spaced apart from one another, along the lateral axis.

The first period, parallel to the longitudinal axis, may be comprised between 100 nm and 300 nm, and preferably between 200 nm and 300 nm. The second period may be comprised between 200 nm and 400 nm, and preferably between 300 nm and 400 nm. The thickness of the thin layer, along the propagation axis, may be comprised between 100 nm and 300 nm.

The holder may be bounded by a top face, adjacent to the thin layer, and a bottom face, opposite to the top face. The image sensor may then be placed, facing the holder, closer to the bottom face than to the top face.

According to one embodiment, no image-forming optics, for example such as lenses or objectives, lie between the holder and the image sensor. According to another embodiment, an optical system, such as a lens or objective, allows the thin layer to be conjugated with the image sensor.

According to one embodiment, the third material, forming the second inclusions, is identical to the second material, forming the first inclusions.

According to one embodiment, the holder and the image sensor are integrated together. They may form the same component.

The first subject of the invention may comprise features described with reference to the second subject of the invention and vice versa.

The invention will be better understood on reading the description of the examples of embodiments, which examples are described, in the rest of the description, with reference to the figures listed below.

DESCRIPTION OF PARTICULAR EMBODIMENTS

Figure 1A:
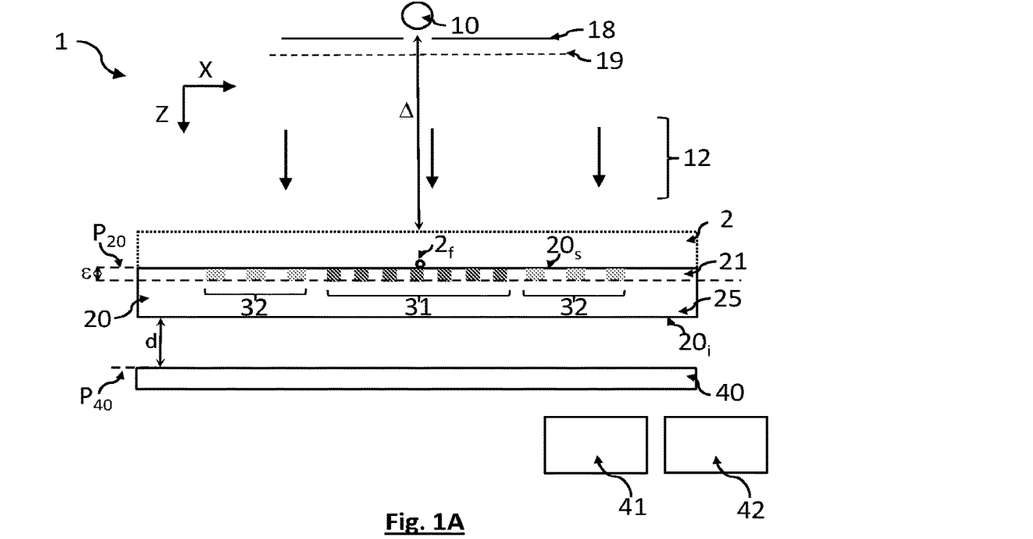
FIG. 1A shows one embodiment of a device according to the invention.

FIG. 1A shows a device 1 forming a first embodiment of the invention. A light source 10 produces an incident light wave 12 in the direction of a holder 20, the latter being placed between the light source 10 and an image sensor 40.

The sample 2 to be analyzed is placed against a holder 20. The holder 20 is bounded by a top face $20_s$, which is placed facing the light source 10, and a bottom face $20_i$, which is placed facing the image sensor 40. The image sensor is closer to the bottom face $20_i$ than to the top face $20_s$.

In this example, the sample 2 is a liquid sample, containing fluorescent particles $2_f$. The liquid may notably comprise a biological liquid, such as blood, lymph, semen, inter alia. Each fluorescent particle $2_f$ emits fluorescence light 16, in a fluorescence spectral band, $\Delta\lambda_f$, when it is illuminated in an excitation spectral band $\Delta\lambda_e$. The incident wavelength 12, emitted by the light source, lies in an illumination spectral band $\Delta\lambda$ corresponding to all or some of the excitation spectral band $\Delta\lambda_e$. Preferably, the illumination spectral band $\Delta\lambda$ does not lie in the fluorescence spectral band $\Delta\lambda_f$, or if so marginally. By marginally, what is meant is that at most 5%, or even 1%, or even 0.1%, of the intensity of the incident light wave is emitted in the fluorescence spectral band $\Delta\lambda_f$.

Whatever the embodiment, the illumination spectral band $\Delta\lambda$ of the light source 10 is preferably adjusted to a first resonant wavelength $\lambda_{r1}$ of a first photonic crystal 31 formed in the holder 20, as described below. The illumination spectral band $\Delta\lambda$ may be located in the visible domain, in the near UV (>200 nm), near infrared (<3 μm) or mid infrared (between 3 and 10 to 12 μm). A bandpass filter 19 may be placed between the light source 10 and the holder 20, so as to adjust the illumination spectral band of the light source, in particular with respect to the aforementioned resonant wavelength. The width of the illumination spectral band $\Delta\lambda$ of the incident light wave 12 is preferably smaller than 50 nm, or even than 10 nm, or even than 5 nm.

Generally, a fluorescent particle $2_f$ has a size advantageously smaller than 1 mm, or even smaller than 500 μm, and preferably a size comprised between 5 nm and 100 μm. It may notably be a question of a biological particle, such as a bacterium, or other micro-organism, virus, cell, a blood cell for example, or of a microbead. It may also be a question of a molecule, for example a protein, or a protein fragment. It may also be a question of a molecule forming a sequence of nucleotides. The particle exhibits endogenous or exogenous fluorescence. In the latter case, it may have been marked beforehand with a fluorescent marker.

The sample 2 may also be a solid, sufficiently thin that the incident light wave 12 can reach the holder 20. It may for example be a question of a sample obtained by drying a liquid on the holder 20, or of a thin solid slice, for example a slice of a biological tissue such as a pathology slide.

The light source 10 is preferably a point light source. It may notably comprise a diaphragm 18, or spatial filter. The aperture of the diaphragm is typically comprised between 5 μm and 1 mm, preferably between 50 μm and 500 μm, and for example is 150 μm. The diaphragm may be replaced by an optical fiber, and preferably a single-mode optical fiber, a first end of which is placed facing the light source 10 and a second end of which is placed facing the top face $20_s$ of the holder. The light source 10 may for example be a light-emitting diode, in which case use of a diaphragm is preferable. The light source may be a laser source, such as a laser diode. The wavelength of the light source may be tunable. It may be a tunable laser source. It may be a quantum cascade laser (QCL) and in particular an external cavity laser.

The incident light wave 12 produced by the light source 10 propagates toward the holder parallel to a propagation axis Z. Preferably, it reaches the holder 20 in the form of a plane wave, or a wave that may be considered to be such, the angle of incidence preferably being normal to a holder plane $P_{20}$, in which the holder 20 lies.

The distance Δ between the light source and the sample is preferably larger than 1 cm and preferably comprised between 2 and 30 cm. Advantageously, the light source, as seen by the sample, may be considered to be a point light source. By this, what is meant is that its diameter (or its diagonal) is preferably smaller than one tenth, and better still one hundredth, of the distance between the sample and the light source. Thus, the light wave reaches the holder in the form of a plane wave, or one that may be considered as such, the angle of incidence being, in this example, normal.

The image sensor 40 is able to form an image in a detection plane $P_{40}$. In the example shown, the illumination spectral band $\Delta\lambda$ of the light source 10 is located in the visible domain. The image sensor 40 may then be a matrix array photodetector comprising a matrix array of pixels, of CCD or CMOS type. The detection plane $P_{40}$ in this example extends perpendicular to the propagation axis Z of the incident light wave 12. The image sensor may comprise a steering system such as a mirror for steering the image toward a matrix array of pixels, in which case the detection plane $P_{40}$ corresponds to the plane in which the image-steering system lies. Generally, the detection plane $P_{40}$ corresponds to the plane in which an image is formed.

A processing unit 41 allows the images acquired by the image sensor 40 to be processed. It is connected to a memory 42, allowing image-processing operations to be performed on the acquired images.

The distance d between the holder 20 and the matrix array of pixels of the image sensor 40 is preferably comprised between 0 and 2 cm, and more preferably comprised between 0 and 2 mm.

In the embodiment shown in FIG. 1A, the absence of magnifying or image-forming optics between the image sensor 40 and the sample 2 will be noted. This does not prevent focusing microlenses potentially being present level with each pixel of the image sensor 40, these microlenses not performing the function of magnifying the image. This allows a compact device to be obtained. In addition, such a configuration allows a large field of observation to be obtained.

Figure 1B:
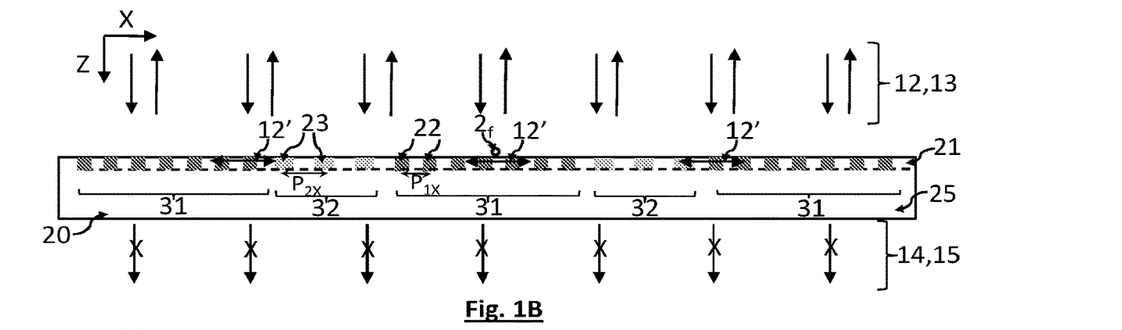
FIGS. 1B and 1C show a sample holder forming part of the device.
Figure 1C:
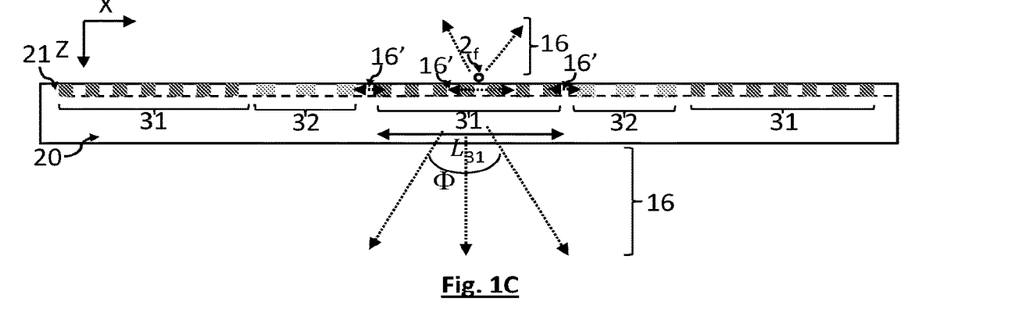
Figure 1D:
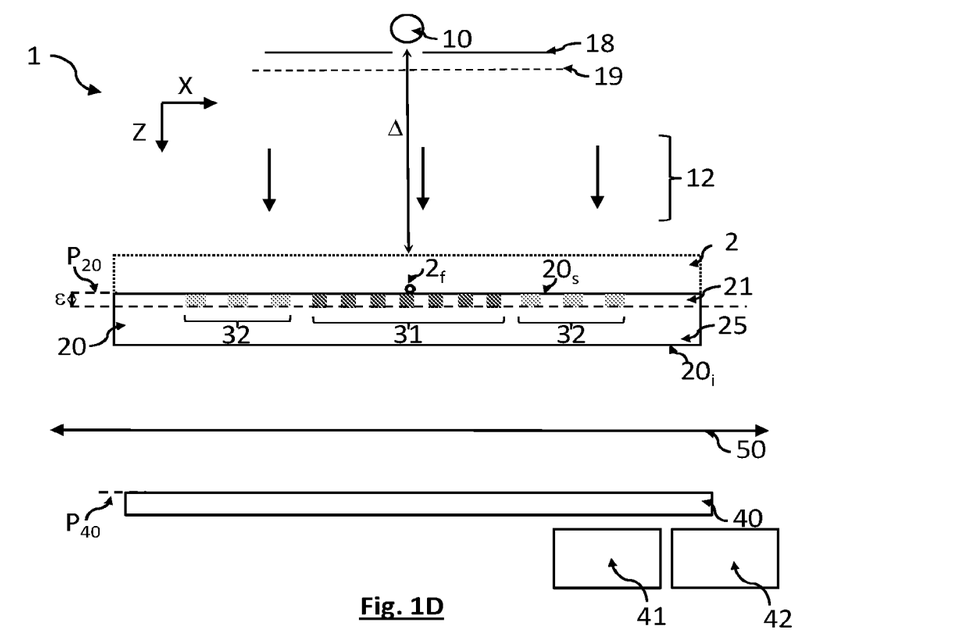
FIGS. 1D and 1E schematically show other embodiments of the device according to the invention.

According to another embodiment, shown in FIG. 1D, an objective or a lens 50 may be placed between the holder 20 and the image sensor 40, this allowing the image sensor to be moved away from the holder while ensuring the images formed by the image sensor preserve a good spatial resolution. The objective or the lens 50 allows the image sensor 40 to be conjugated with the thin layer 21.

Figure 1E:
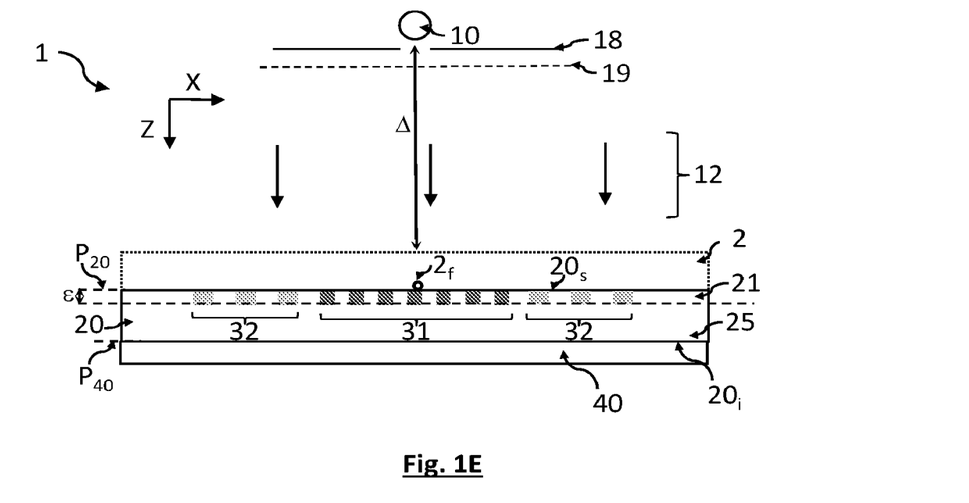

According to another embodiment, shown in FIG. 1E, the holder 20 forms a cover of the image sensor 40. Thus, the image sensor 40 and the holder 20 form the same component. The distance d between the image sensor and the holder is then zero.

The holder 20 comprises a uniform bottom portion 25, formed from a base material the refractive index of which is $n_0$. The base material is transparent to the fluorescence spectral band $\Delta\lambda_f$. The thickness of the bottom portion 25 is for example a few hundred of μm to a few mm. In the example embodied, the thickness of the bottom portion 25 is 725 μm.

The holder also comprises a thin nano-structured layer 21. In the embodiments shown, the thin layer 21 is adjacent the top face $20_s$ of the holder 20. The term thin layer designates a layer the thickness E of which is smaller than 5 μm, or even than 1 μm. The thickness E may notably be defined with respect to a wavelength λ of the illumination spectral band $\Delta\lambda$, for example the central wavelength of the illumination spectral band. Preferably, $\varepsilon \leq \lambda$, or even, $\varepsilon \leq \lambda/2$. The thin layer 21 is parallel to the plane of the holder $P_{20}$.

The thin layer 21 is made of a first material, which is transparent to all or some of the illumination spectral band $\Delta\lambda$ of the light source, and to the fluorescence spectral band $\Delta\lambda_f$. The first material has a first refractive index $n_1$. The first material may be the same as the base material forming the rest of the holder, in which case $n_1=n_0$. It may for example be a question of $SiO_2$. The thin layer 21 is placed at the interface between the sample 2 and the holder 20. Thus, the sample 2 makes contact with the thin layer 21, or is at a distance from the latter smaller than 10 μm, and preferably at a distance smaller than the illumination wavelength.

As detailed in FIG. 1B, the thin layer 21 comprises first inclusions 22, made of a second material, which is transparent to all or some of the illumination spectral band $\Delta\lambda$ and in all or some of the fluorescence spectral band $\Delta\lambda_f$. The second material has a second refractive index $n_2$. The difference between the first index $n_1$ and the second index $n_2$ is preferably larger than 0.1 or even than 0.25. Thus, $n_2>n_1$ and $n_2>n_0$.

Each first inclusion 22 may also have the shape of a cone or a conical frustum, of circular or polygonal base, or have a hemispherical shape. Whatever the shape adopted, each first inclusion 22 is micron-sized, i.e., in the holder plane $P_{20}$, the largest dimension of each first inclusion 22 is smaller than the wavelength of the illumination spectral band. "Sub-wavelength" size is spoken of. The first inclusions 22 define, in the thin layer 21, a first photonic crystal 31. They are arranged in a first pattern, which is repeated periodically over the thin layer 21.

The holder plane $P_{20}$ is defined by a longitudinal axis X perpendicular to a lateral axis Y. The first inclusions 22 may lie parallel to the lateral axis Y, in which case the first photonic crystal 31 is one-dimensional. The first inclusions may be distributed periodically along the longitudinal axis X and along the lateral axis Y, in which case the first photonic crystal 31 is two-dimensional. The first photonic crystal is parameterized by the respective indices of the first material and of the second material, and by the size of the first inclusions 22. It is also parameterized by a first period $P_{1X}$ along the axis X. When the photonic crystal is two-dimensional, it is also parameterized by a first period $P_{1Y}$ along the axis Y. By period, what is meant is the spacing, center to center, between two adjacent inclusions along the axis X or along the axis Y.

The first photonic crystal 31 has a first resonant wavelength $\lambda_{r1}$, at which the properties of transmission and of reflection of the light may be determined using simulations performed via computational codes. Specifically, the properties of propagation of the light in diffraction gratings stem from their specific periodic arrangement and are easily modelled, by anyone skilled in the art, using Maxwell's space- and time-dependent equations. In the rest of this description, the modelling is carried out using the software package RSOFT-Fullwave, which implements a finite-difference, time-domain (FDTD) method.

By photonic crystal, what is meant is a structure, and, for example, a dielectric structure, the index of which varies periodically at the scale of the wavelength, in one or more directions. The invention thus takes advantage of the development of techniques for microstructuring dielectric materials, allowing the interaction of electromagnetic waves in three-dimensional structures to be controlled based on the arrangement of materials of different indices. By virtue of the nanoscale precision of microfabrication processes, it is possible, at the present time, to produce photonic crystals corresponding to a scale of structuring of matter close to one quarter or one half wavelength, this making them compatible with optical applications.

In the present case, at the first resonant wavelength $\lambda_{r1}$, the first photonic crystal 31 does not transmit light. At the first resonant wavelength $\lambda_{r1}$, the first photonic crystal allows a portion of the incident wave 12, which reaches the thin layer 21 at a normal angle of incidence, to be confined in the thin layer 21, thus forming a confined light beam 12'. The confined light beam 12' thus propagates along the thin layer 21, at the interface between the holder 20 and the sample 2.

The first resonant wavelength $\lambda_{r1}$ is comprised in the illumination spectral band $\Delta\lambda$ of the incident wavelength 12. It is therefore comprised in the excitation spectral band $\Delta\lambda_e$ of the fluorescent particle $2_f$.

The coupling coefficient $\Gamma$ of the photons of the incident wave 12 in the thin layer 21 may for example reach 10%. By coupling coefficient, what is meant is a ratio between a number of coupled photons and a number of incident photons. In this case, 10% of the incident flux is coupled to the resonant grating. The decoupling coefficient of the thin layer 21, or leakage rate, has the same value as the coupling coefficient $\Gamma$, in the present case 10%. During the illumination of the holder 20 by the source 10, at the first resonant wavelength $\lambda_{r1}$, the intensity of the light beam 12' confined in the thin layer 21, by the first photonic crystal, increases almost instantaneously, to exceed times the intensity of the incident light wave. The photons coupled by the first photonic crystal 31 compensate for losses due to decoupling. These losses form a wave 13 that propagates toward the light source, and a wave 15 that propagates toward the image sensor 40, the waves 13 and 15 propagating parallel to the propagation axis Z.

The intensity of the wave 13 reflected by the holder 20 in a direction opposite to the propagation direction Z is equivalent to the intensity of the incident light wave 12. Moreover, the wave 15 formed by the losses from the grating in the propagation direction Z is in phase opposition to a wave 14 transmitted by the holder, the latter wave being formed by the portion of the incident light wave 12 not coupled by the first photonic crystal. By transmitted by the holder, what is meant is having propagated through the holder, then beyond the latter, in the same direction as the incident light wave 12. Destructive interference then occurs, blocking exposure of the image sensor 40. This destructive interference is symbolized, in FIG. 1B, by the symbol X.

Therefore, at the first resonant wavelength $\lambda_{r1}$, the first photonic crystal 31 acts as a resonant mirror, with a reflection coefficient close to 1. Resonant reflection is spoken of. Under these conditions, the image sensor 40 is in a configuration in which the field should be black, because it is not exposed to light coming from the holder 20. In fact, on account of imperfections, the image sensor 40 is exposed to a field of low grayscale value and that may be considered to be uniform.

Because of the confinement of the incident light 12, in the illumination spectral band, by the thin layer 21, each fluorescent particle $2_f$ is subjected to an intense excitation beam. This contributes to increasing the amount of fluorescence light 16 emitted by each fluorescent particle. Specifically, the amount of fluorescence light is generally considered to be an increasing, and generally linear, function of the amount of excitation light. The confined beam 12' in the thin layer 21 allows an amplification of the intensity of the light wave reaching each fluorescent particle, at the excitation wavelength. This results in a significant increase in the intensity of the fluorescence light 16 emitted by each thereof.

As may be seen in FIG. 1B, a plurality of first photonic crystals 31, which are separate from one another, are distributed in the thin layer 21. Between two adjacent first photonic crystals 31, the thin layer 21 comprises second inclusions 23, which are made of a third material, which is transparent to all or some of the fluorescence spectral band $\Delta\lambda_f$. The third material has a third refractive index $n_3$. The difference between the first index $n_1$ of the first material, forming the thin layer 21, and the third index $n_3$ is preferably larger than 0.1 or even than 0.25. The third index $n_3$ is larger than the first index $n_1$.

The second inclusions 23 have geometric characteristics such as those described with reference to the first inclusions 22. The second inclusions 23 form, with the first material of the thin layer 21, a second photonic crystal 32, the latter being configured to have a second resonant wavelength $\lambda_{r2}$. The second resonant wavelength $\lambda_{r2}$ is different from the first resonant wavelength $\lambda_{r1}$ of the first photonic crystals. The second resonant wavelength $\lambda_{r2}$ is comprised in the fluorescence spectral band $\Delta\lambda_f$.

Just like the first photonic crystal 31, the second photonic crystal 32 is defined to have a second period $P_{2X}$ along the longitudinal axis X and, when the crystal is two-dimensional, a second period $P_{2Y}$ along the lateral axis Y. Since the fluorescence wavelength is longer than the excitation wavelength, in each direction, the second period is longer than the first period. Thus, $P_{2X} > P_{1X}$ and $P_{2Y} > P_{1Y}$.

The third material, forming the second inclusions 23, may be different from or similar to the second material, forming the first inclusions 22. It may for example be a question of $Si_3N_4$ (SiN).

Under the effect of the illumination light wave 12 and of the confined beam 12' that propagates at the interface between the holder 20 and the sample 2, each fluorescent particle $2_f$, located in contact with the thin layer or at a sufficiently small distance from the latter, emits fluorescence light 16, in a solid angle of $4\pi$. The effect of amplification of the fluorescence light by the confined beam is obtained only in contact with the thin layer, or at a sub-wavelength distance from the latter. It is a so-called near-field effect.

Some of the fluorescence light 16 propagates through the thin layer 21, and more precisely through a first photonic crystal 31, forming a confined fluorescence beam 16'. The thin layer 21 comprises a plurality of first photonic crystals 31 that are separated from one another by a second photonic crystal 32. The confined fluorescence beam 16' forms in the photonic crystal, or in the photonic crystals, closest to the fluorescent particle $2_f$.

Each first photonic crystal 31 is not resonant at the wavelengths of the fluorescence spectral band $\Delta\lambda_f$. Because of the presence of the first inclusions $n_1$, each first photonic crystal has an effective refractive index $n_{eff}$ that is higher than the index no of the base material forming the holder 20. This difference in index between each first photonic crystal 31 and the bottom portion of the holder 25 explains the formation of the confined fluorescence beam 16'. By effective index $n_{eff}$, what is meant is an average of the index $n_1$ of the first material, forming the thin layer 21, and of the index $n_2$ of the second material, forming the first inclusions 22, the average being weighted by the respective volumes of the first material and of the second material in the thin layer 21. Thus, the first photonic crystal, or the first photonic crystals, closest to the site of emission of the fluorescence, behave as waveguides of index $n_{eff}$.

Some of the confined fluorescence beam 16' decouples, and propagates toward the image sensor 40.

Each second photonic crystal 32 is configured to form a reflector in the fluorescence spectral band. Thus, as shown in FIG. 1C, the confined fluorescence beam 16', which propagates through a first photonic crystal 31, is reflected by the second photonic crystals 32 adjacent the first photonic crystal. Thus, a guided mode, which propagates through a first photonic crystal 31 and is reflected in succession by the photonic crystals 32 lying on either side of the first photonic crystal 31, is obtained. In the same way as a Fabry-Perot cavity, this results in an amplification of the fluorescence signal inside the thin layer.

The width $L_{31}$, parallel to the longitudinal axis X, along which the first photonic crystal 31 extends, is preferably such that:

$$\frac{2\pi}{\lambda_f} n_{eff} \times 2L_{31} + 2\varphi = 2\pi m \tag{1}$$

where
 $\varphi$ corresponds to the phase shift produced by each reflection induced by a second photonic crystal 32. It may be determined by numerical modelling.
 m is a non-zero natural integer.
 $\lambda_f$ is a fluorescence wavelength.
with $$n_{eff} = \sqrt{ff \times n_2 + (1-ff) \times n_1} \tag{2}$$

where ff corresponds to the fraction per unit volume of the thin layer 21 occupied by the first inclusions 22 in a given first photonic crystal 31.
The following is obtained:

$$L_{31} = \frac{\lambda_f (\pi m - \varphi)}{2\pi n_{eff}} \tag{3}$$

Thus, to obtain a high amplification of the fluorescence light, the dimension $L_{31}$, along the longitudinal axis X, of the first photonic crystal will satisfy equation (3).

Each confined fluorescence beam propagates only through a single first photonic crystal 31, while being reflected on either side of the latter, by the second photonic crystals 32 adjacent to the first photonic crystal. It is therefore a question of a localized confinement effect. Thus, the image formed, on the image sensor 40, allows regions of the sample in which fluorescence is emitted to be located. This image may allow the extent of these regions, in the holder plane, to be evaluated or their number to be counted. It may also allow the relative fluorescence intensities of various fluorescent regions of a number of samples to be compared.

Figure 2A:
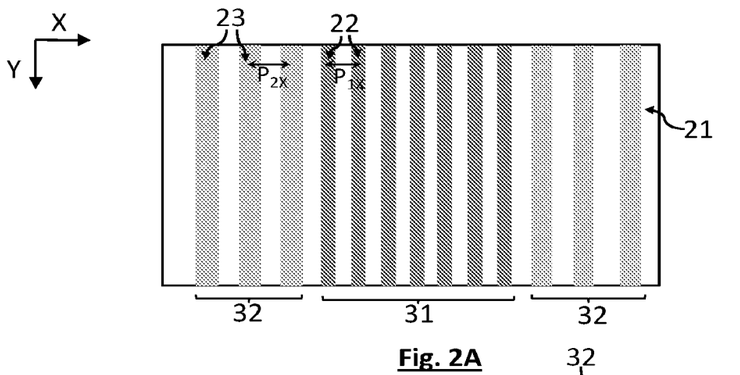
FIG. 2A illustrates an embodiment in which the sample holder comprises a thin layer formed from one-dimensional photonic crystals.

A first example of the dimensions of one-dimensional first photonic crystals and of one-dimensional second photonic crystals such as shown in FIG. 2A is:
  material of the holder $SiO_2$, thickness 725 μm;
  first material (thin layer): $SiO_2$;
  thickness s of the thin layer 21: 160 nm;
  second material (first inclusions 22): $Si_3N_4$ (SiN—silicon nitride);
  fill factor of the first photonic crystal: 50%;
  diameter of the first inclusions: 130 nm;
  first period $P_{1X}$ of the first photonic crystal: 260 nm;
  resonant wavelength of the first photonic crystal: 405 nm;

third material (second inclusions 23): $Si_3N_4$ (SiN—silicon nitride);
fill factor of the second photonic crystal: 50%;
second period $P_{2X}$ of the second photonic crystal: 330 nm;
diameter of the second inclusions: 165 nm;
resonant wavelength of the second photonic crystal: 550 nm.

Figure 2B:
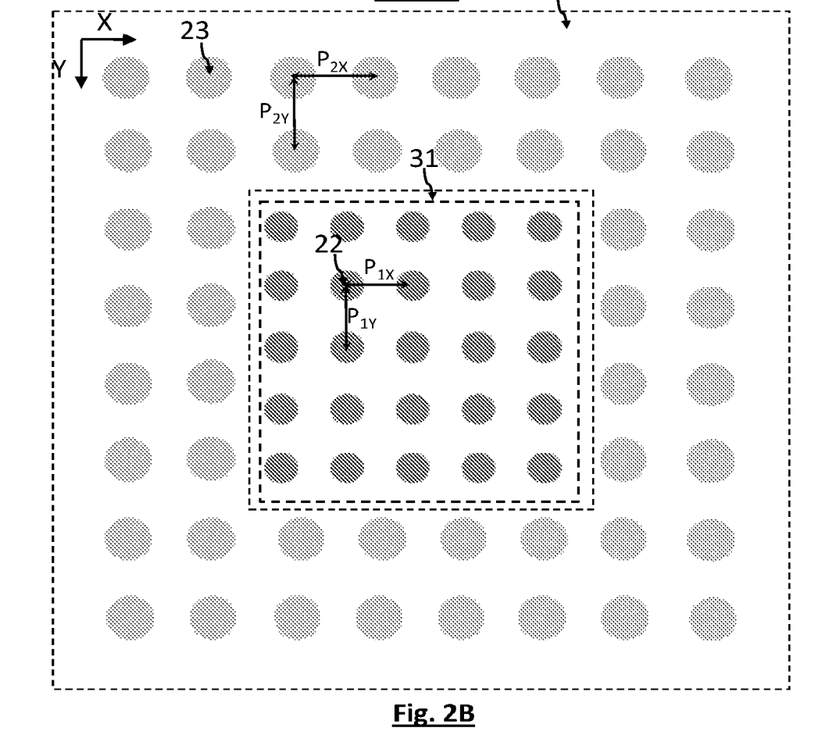
FIGS. 2B and 2C illustrate embodiments in which the sample holder comprises a thin layer formed from two-dimensional photonic crystals.
Figure 2C:
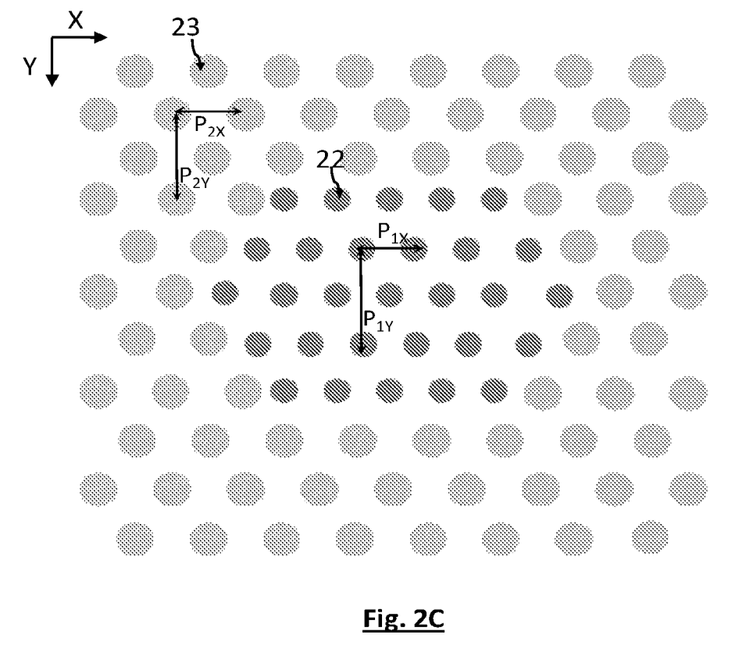

FIGS. 2B and 2C show examples of two-dimensional photonic crystals. In FIG. 2B, the first and second photonic crystals are encircled by a dashed frame. For a given photonic crystal, the period of repetition of the pattern along the longitudinal axis ($P_{1X}$ or $P_{2X}$) may be identical to or different from the period of repetition of the pattern along the lateral axis ($P_{1Y}$ or $P_{2Y}$).

Simulations of the strength of the electric field in various holders, comprising one-dimensional photonic crystals, similar to those described with reference to FIG. 2A, have been carried out.

Figure 3A:
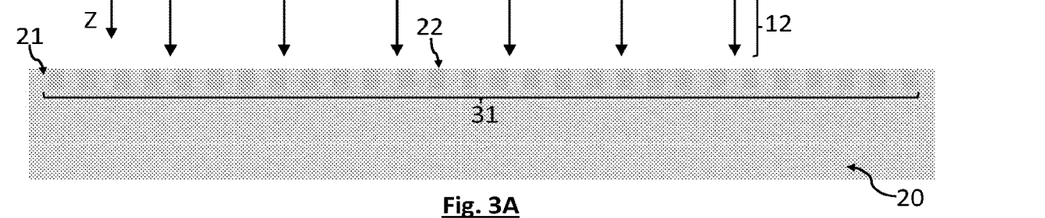
FIG. 3A shows a modelled configuration, in which the sample holder comprises a thin layer formed from a first photonic crystal.
Figure 3B:
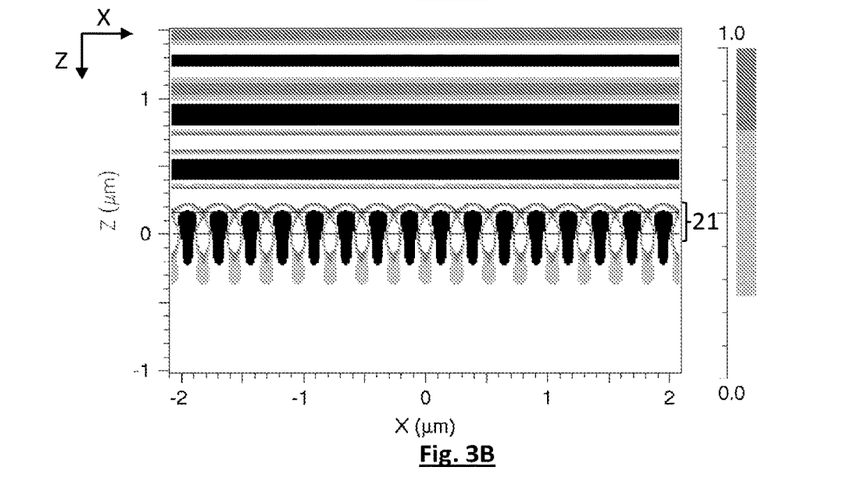
FIGS. 3B and 3C are the results of modelling the propagation of an electromagnetic field in the configuration shown in FIG. 3A, at two different wavelengths, respectively.
Figure 3C:
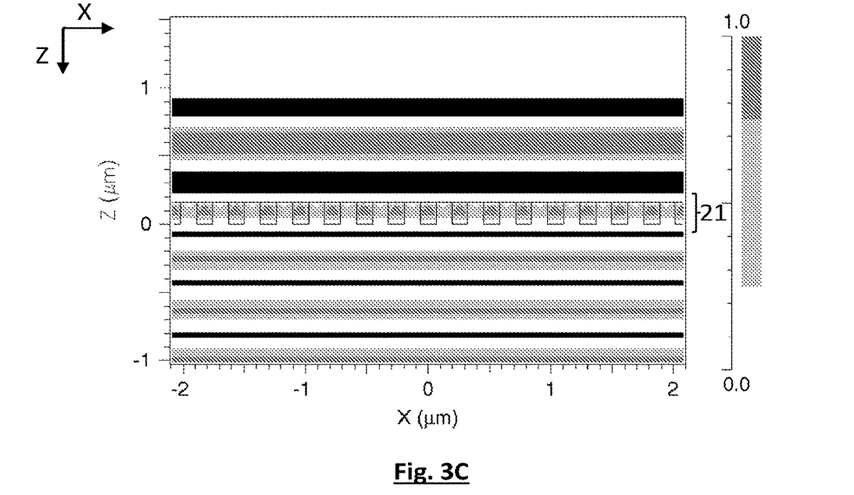

FIGS. 3A to 3C show the results of a first round of modelling. In FIG. 3A, the modelled structure is shown: it is a question of an $SiO_2$ holder 20 having, at the interface with open air 3, a thin layer 21 comprising a first photonic crystal, the parameters of which are such as in the first example described above. The thin layer 21 is formed solely of SiN inclusions 22 in $SiO_2$ having a period of 260 nm and a fill factor of 50%.

FIGS. 3B and 3C show the strength of the electric field when the holder is illuminated by an incident light wave 12, respectively:
at the wavelength of 405 nm, which corresponds to the resonant wavelength of the first photonic crystal 31;
and at the wavelength of 550 nm, which corresponds to the modelled fluorescence wavelength.

It may be seen that, at the resonant wavelength (FIG. 3B), the first photonic crystal behaves as a mirror. At the fluorescence wavelength (FIG. 3C), the first photonic crystal transmits light, the latter propagating through the holder 20.

Figure 4A:
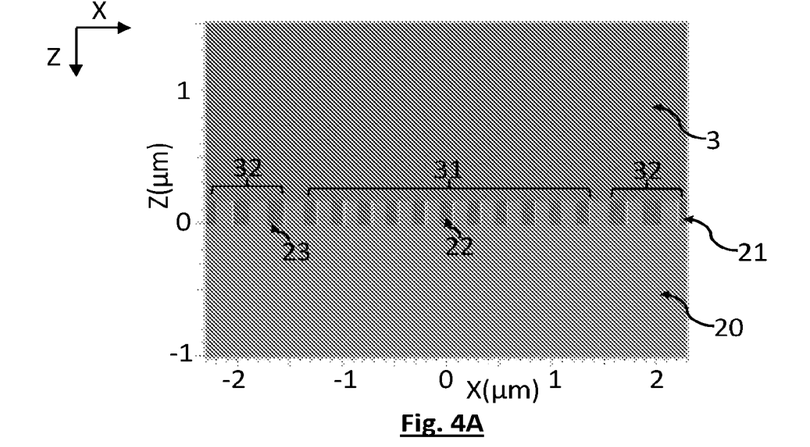
FIG. 4A shows a modelled configuration, representative of the invention.
Figure 4B:
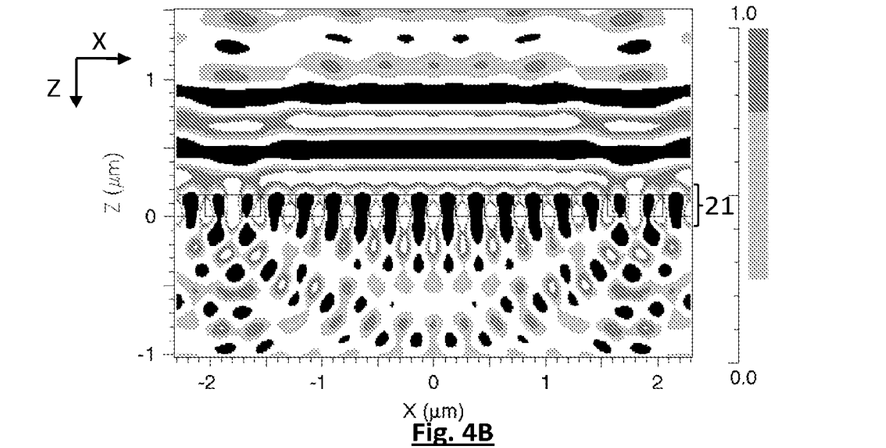
FIGS. 4B and 4C are the results of modelling the propagation of an electromagnetic field in the configuration shown in FIG. 4A, at two different wavelengths, respectively.
Figure 4C:
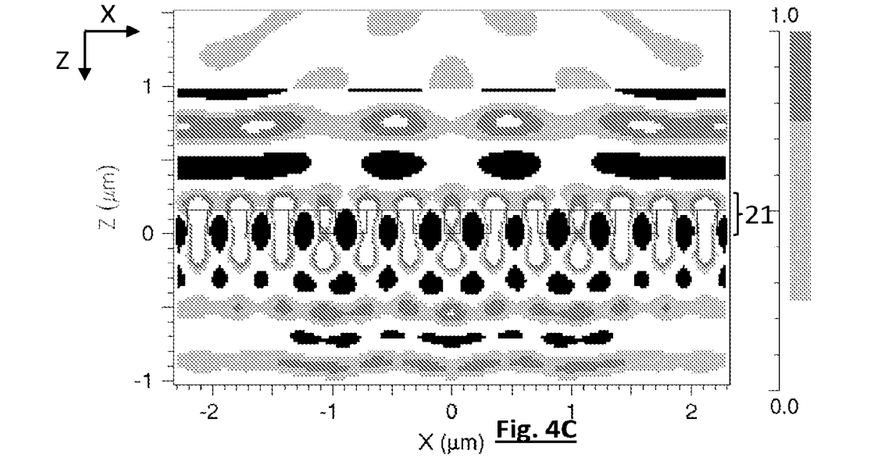

FIGS. 4A to 4C show the results of a second round of modelling. In FIG. 4A, the modelled structure has been shown: it is a question of an $SiO_2$ holder 20 having, at the interface with open air 3, a thin layer 21 comprising a first photonic crystal 31 and a second photonic crystal 32, the parameters of which are such as in the first example described above. The first photonic crystal 31 extends, parallel to the axis X, a length $L_{31}$ respecting equation (3).

FIGS. 4B and 4C show the strength of the electric field when the holder is illuminated by an incident light wave 12, respectively:
at the wavelength of 405 nm, which corresponds to the resonant wavelength of the first photonic crystal 31;
and at the wavelength of 550 nm, which corresponds to the modelled fluorescence wavelength.

It may be seen that, at the resonant wavelength (FIG. 4B), the intensity of the light wave propagating at the surface of the holder 20 (or near-field intensity) increases, the increase being estimated to be a factor of 10 with respect to a configuration in which the holder 20 consists solely of $SiO_2$. When the resonant wavelength corresponds to the excitation wavelength of the fluorescence, this leads to a substantial increase in the fluorescence excitation field at the top face 20, of the holder.

At the fluorescence wavelength (FIG. 4C), an increase in the intensity of the light wave propagating through the holder 20 is observed, the increase being estimated to be a factor of 7 with respect to a configuration in which the holder 20 consists solely of $SiO_2$.

Thus, the invention allows the intensity of the illumination light wave propagating at the surface of the thin layer 21, and allowing the excitation of the fluorescence, to be increased by a factor of 10. It also allows the intensity of the fluorescence light wave propagating through the holder 20 to be increased by a factor of 7. Since the two increases may multiply each other, the modelling schematically illustrated in FIGS. 4A to 4C makes it possible to expect an increase of a factor of 70 in the fluorescence intensity detected by an image sensor placed facing the holder 20, as described with reference to FIG. 1A.

Figure 5A:
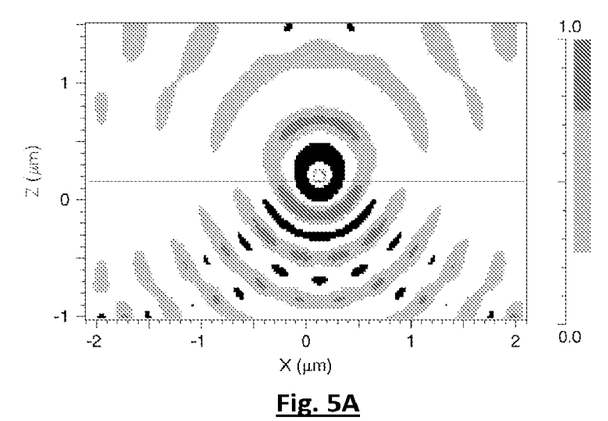
FIG. 5A illustrates a propagation of an electromagnetic field when a particle is placed on a uniform holder made of silica.
Figure 5B:
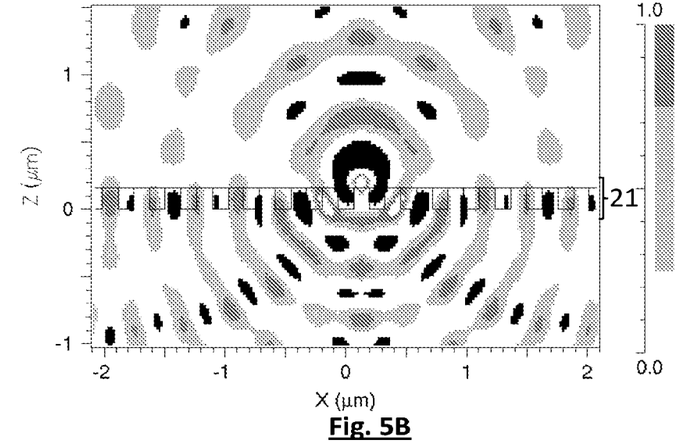
FIG. 5B illustrates a propagation of an electromagnetic field, at a fluorescence wavelength, when a particle is placed on a holder such as shown in FIG. 3A.
Figure 5C:
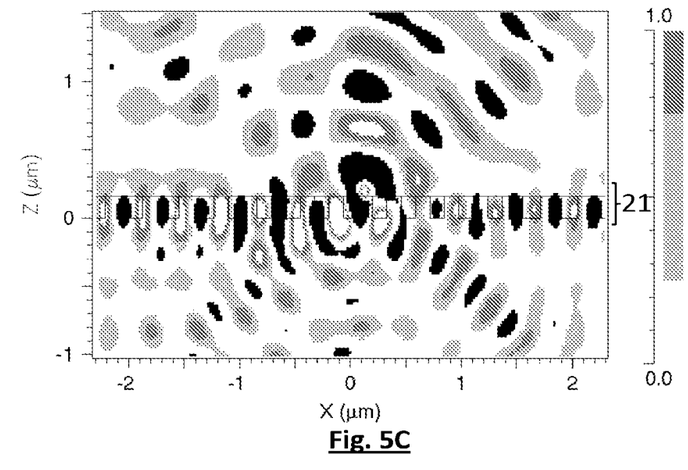
FIG. 5C illustrates a propagation of an electromagnetic field, at a fluorescence wavelength, when a particle is placed on a holder such as shown in FIG. 4A.

FIGS. 5A to 5C show the results of other rounds of modelling. In FIGS. 5A, 5B and 5C, the strength of the electric field has been modelled by illuminating an electric dipole at the wavelength of 550 nm, the dipole being:
placed on a simple holder made of $SiO_2$: FIG. 5A;
placed on a thin layer 21 comprising a first photonic crystal, such as shown in FIG. 3A: FIG. 5B;
placed on a thin layer 21 according to the invention, such as shown in FIG. 4A: FIG. 5C.

Once again an increase by a factor of 7 is observed between the prior-art configuration (FIG. 5A) and the configuration according to the invention (FIG. 5C).

Comparison of FIG. 5B and FIG. 5C shows that the strength of the electromagnetic field propagating through the holder 20 is much higher with the configuration according to the invention. Specifically, the first photonic crystal 31 is not resonant at the wavelength of 550 nm. FIG. 5B shows a confinement of the light wave in the thin layer 21, under the effect of the effective index of the latter, which is higher than the index of the holder 20 (in the present case the index of the bottom layer 25) and than the index of air.

Moreover, in FIG. 5C, it may be seen that the fluorescence light propagates, from the thin layer 21, with an angle Φ comprised between 0° and 45°, about the propagation axis Z.

Figure 6:
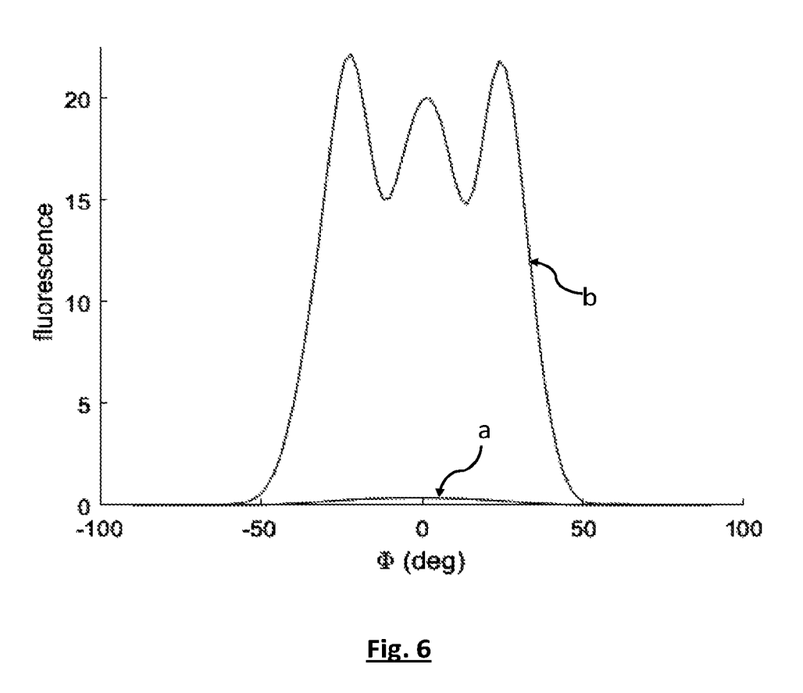
FIG. 6 shows the intensity profiles of images formed with a silica holder, according to the prior art, and a holder according to the invention, respectively.

FIG. 6 shows the results of a simulation of a profile of a fluorescence image obtained by placing a fluorescent particle, modelled by an electric dipole, on a simple glass holder (curve a) and on a holder according to the invention (curve b). The increase in the signal collected by employing a holder according to the invention may be seen. It may also be seen that the fluorescence light propagates, from the thin layer 21, in such a way as to form a cone of light the half-angle of which is about 50°, this corroborating the observations made with reference to FIG. 5C.

Thus, the fluorescence reaches the image sensor 40 by forming a divergent cone from the thin layer, with a relatively high half-angle. In order to obtain a fluorescence image of correct spatial resolution, it is preferable to place the image sensor as close as possible to the holder 20, and for example in contact with the latter. The lensless imaging configuration is therefore particularly suitable for the holder 20.

FIGS. 7A to 7H illustrate the manufacturing steps of a holder such as described above.

Figure 7A:
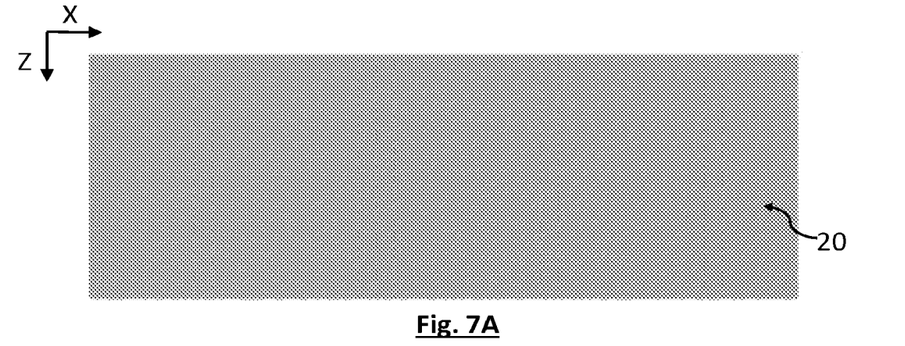
FIGS. 7A to 7H schematically show the main steps of manufacture of a holder able to be used in a device or method according to the invention.
Figure 7B:
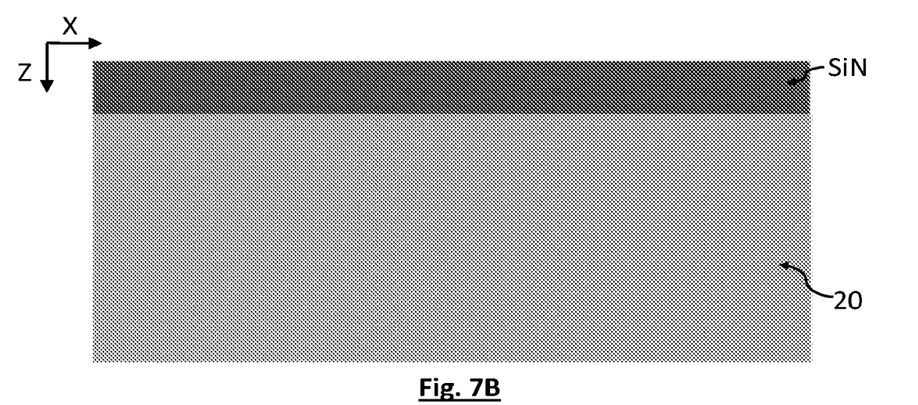
Figure 7C:
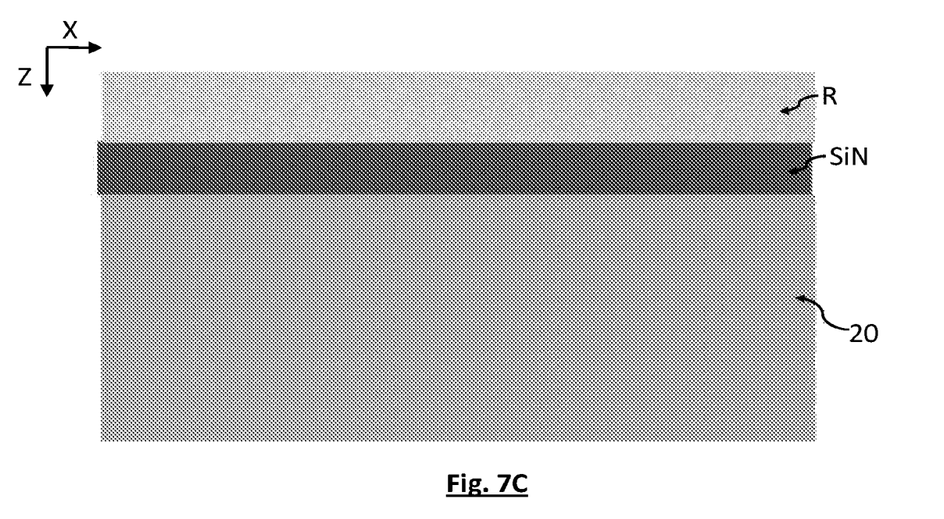
Figure 7D:
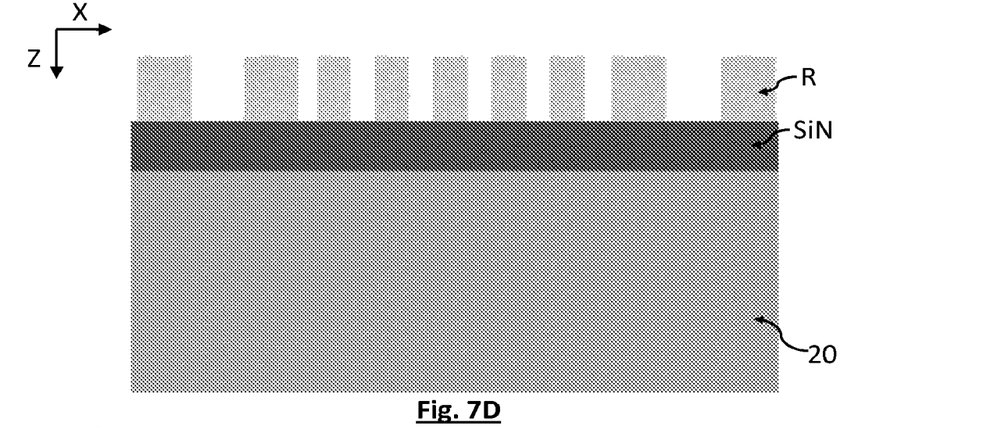
Figure 7E:
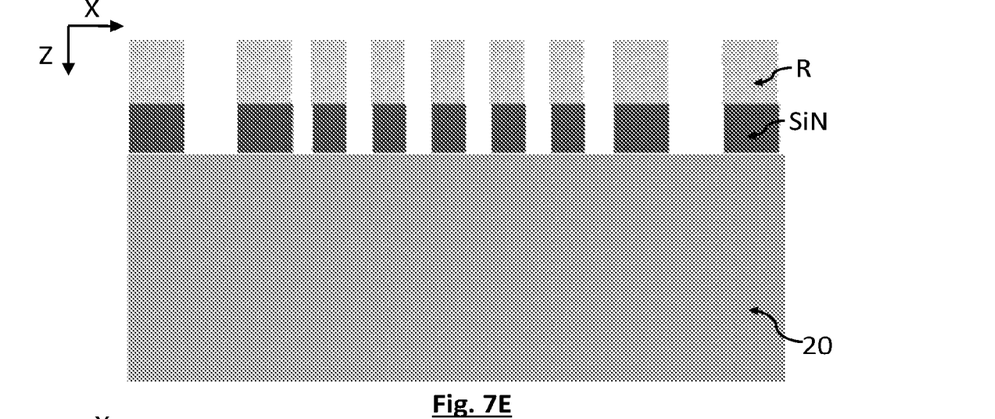
Figure 7F:
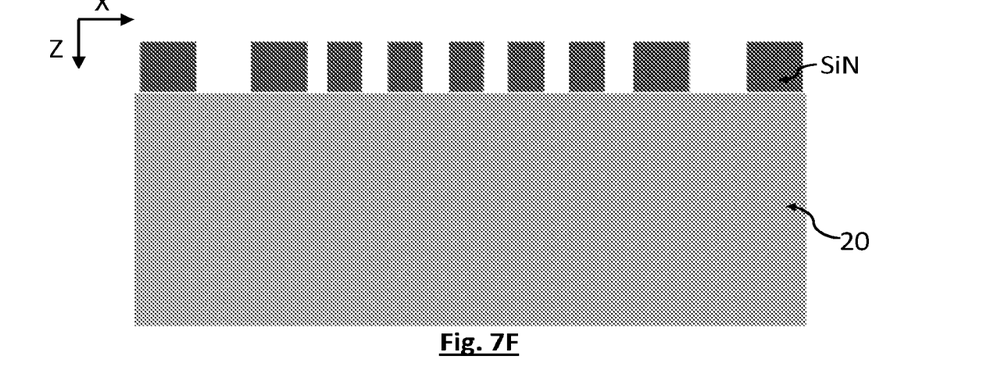
Figure 7G:
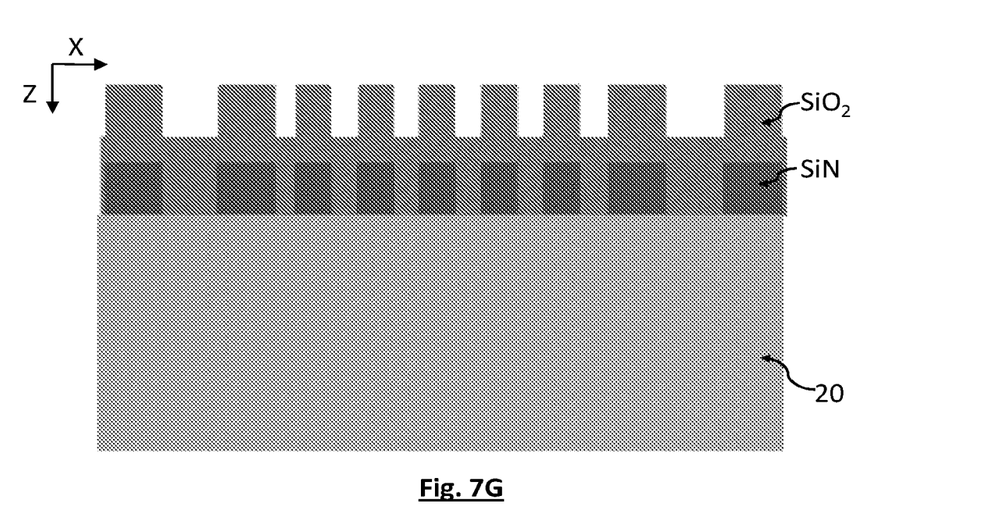
Figure 7H:
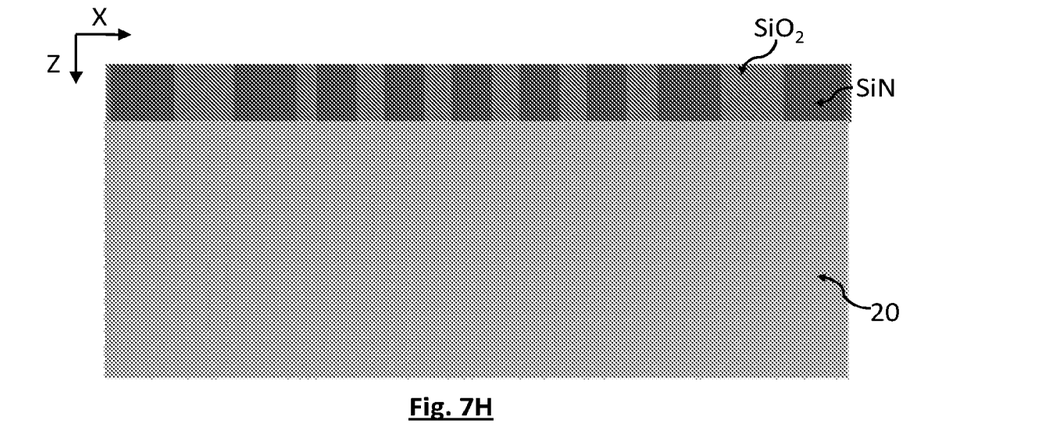

FIG. 7A shows a holder 20 made of $SiO_2$. A layer of SiN of 160 nm thickness is deposited: cf. FIG. 7B. A photoresist R is then applied (FIG. 7C). Photolithography of the resist is performed (FIG. 7D), followed by reactive ion etching (RIE): cf. FIG. 7E. The resist is then removed (FIG. 7F). $SiO_2$ is then deposited by conformal deposition (FIG. 7G). FIG. 7H shows a step of chemical mechanical polishing (CMP).

Although described in a lensless configuration, in which no image-forming optics are placed between the holder and the image sensor, according to one variant an optical system, such as a lens or objective, may be placed between the holder and the image sensor.

Moreover, although in the described examples each photonic crystal was obtained using inclusions of silicon nitride in a thin silica layer, this pair of materials is completely non-limiting and the invention may be implemented with other materials, provided that the index difference is sufficient, and in particular larger than 0.25.

The invention claimed is:

1. A method for observing a fluorescent sample, the sample comprising a fluorescent agent that emits fluorescence light, in a fluorescence spectral band, when it is illuminated by excitation light, in an excitation spectral band, the method comprising:
    a) placing the sample against a holder;
    b) illuminating the sample, with a light source, in the excitation spectral band, the light emitted by the light source propagating along a propagation axis;
    c) detecting fluorescence light, in the fluorescence spectral band, with an image sensor;
    wherein
    the holder comprises a thin layer formed from a first material, of a first refractive index, the thin layer lying in a holder plane perpendicular to the propagation axis, the holder plane extending along a longitudinal axis, the thin layer comprising:
        first inclusions formed from a second material, of a second refractive index different from the first refractive index, the first inclusions defining a first periodic pattern, the first inclusions being distributed with a first period, parallel to the longitudinal axis, the first inclusions forming a first photonic crystal that is resonant in the excitation spectral band;
        second inclusions formed from a third material, of a third refractive index different from the first refractive index, and forming a second periodic pattern, the second inclusions being distributed with a second period, parallel to the longitudinal axis, the second period being strictly longer than the first period, the second inclusions forming a second photonic crystal that is resonant in the fluorescence spectral band;
        at least two second photonic crystals being placed on either side of a first photonic crystal;
    such that:
        part of the light emitted by the light source, at the excitation wavelength, is confined in the thin layer, by the first photonic crystal, resulting in a formation and an amplification of a light wave that propagates at an interface between the thin layer and the sample, at the excitation wavelength;
        the fluorescence light propagates in the thin layer, through a first photonic crystal, while being reflected by the second photonic crystals placed on either side of the first photonic crystal, resulting in an amplification of the fluorescence light.

2. The method of claim 1, wherein the sample is placed in contact with the thin layer, or at a distance from the latter smaller than 1 mm.

3. The method of claim 1, wherein
    the first photonic crystal is one-dimensional, the first inclusions extending parallel to a lateral axis perpendicular to the longitudinal axis;
    and/or the second photonic crystal is one-dimensional, the second inclusions extending parallel to the lateral axis.

4. The method of claim 1, wherein
    the first photonic crystal is two-dimensional, the first inclusions being spaced apart from one another, along a lateral axis perpendicular to the longitudinal axis;
    and/or the second photonic crystal is two-dimensional, the second inclusions also being spaced apart from one another; along the lateral axis.

5. The method of claim 1, wherein:
    the first period, parallel to the longitudinal axis; is comprised between 100 nm and 300 nm;
    and/or the second period, parallel to the longitudinal axis, is comprised between 200 nm and 400 nm.

6. The method of claim 1, wherein the thickness of the thin layer, along the propagation axis, is comprised between 100 nm and 300 nm.

7. The method of claim 1, wherein the holder is placed between the sample and the image sensor.

8. The method of claim 7, wherein no image-forming optics are placed between the image sensor and the holder.

9. The method of claim 1, wherein the third material, forming the second inclusions, is identical to the second material, forming the first inclusions.

10. A device for observing a fluorescent sample; the sample comprising a fluorescent agent that emits fluorescence light, in a fluorescence spectral band, when it is illuminated by excitation light, in an excitation spectral band, the device comprising:
    a light source, configured to emit an illuminating light wave in the excitation spectral band, the light propagating; toward the sample, along a propagation axis;
    a sample holder; configured to receive the sample;
    an image sensor; configured to detect fluorescence light, emitted by the sample; in the fluorescence spectral band;
    wherein:
    the holder comprises a thin layer formed from a first material, of a first refractive index, the thin layer lying in a holder plane perpendicular to the propagation axis, the holder plane extending along a longitudinal axis, the thin layer comprising:
        first inclusions formed from a second material, of a second refractive index different from the first refractive index, the first inclusions defining a first periodic pattern, the first inclusions being distributed with a first period, parallel to the longitudinal axis, the first inclusions forming a first photonic crystal that is resonant in the excitation spectral band, the first photonic crystal being configured to confine a portion of the illumination light wave in the thin layer;
        second inclusions formed from a third material, of a third refractive index different from the first refractive index; and forming a second periodic pattern, the second inclusions being distributed with a second period, parallel to the longitudinal axis, the second period being strictly longer than the first period, the second inclusions forming a second photonic crystal that is resonant in the fluorescence spectral band;
        at least two second photonic crystals being placed on either side of a first photonic crystal.

11. The device of claim 10, wherein:
    the first photonic crystal is one-dimensional, the first inclusions extending parallel to a lateral axis perpendicular to the longitudinal axis;
    and/or the second photonic crystal is one-dimensional, the second inclusions extending parallel to the lateral axis.

12. The device of claim 10, wherein:
the first photonic crystal is two-dimensional, the first inclusions being spaced apart from one another, along a lateral axis perpendicular to the longitudinal axis;
and/or the second photonic crystal is two-dimensional, the second inclusions being spaced apart from one another, along the lateral axis.

13. The device of claim 10, wherein:
the first period, parallel to the longitudinal axis, is comprised between 100 nm and 300 nm;
and/or the second period is comprised between 200 nm and 400 nm.

14. The device of claim 10, wherein the thickness of the thin layer, along the propagation axis, is comprised between 100 nm and 300 nm.

15. The device of claim 10, wherein the holder is bounded by a top face, adjacent to the thin layer, and a bottom face, opposite to the top face, the image sensor being placed, facing the holder, closer to the bottom face than to the top face.

16. The device of claim 10, wherein no image-forming optics lie between the holder and the image sensor.

17. The device of claim 16, wherein the holder and the image sensor form the same component.

18. The device of claim 10, wherein the third material, forming the second inclusions, is identical to the second material, forming the first inclusions.

* * * * *

UNITED STATES PATENT AND TRADEMARK OFFICE
CERTIFICATE OF CORRECTION

PATENT NO. : 11,092,547 B2
APPLICATION NO. : 16/899804
DATED : August 17, 2021
INVENTOR(S) : Benahmed et al.

It is certified that error appears in the above-identified patent and that said Letters Patent is hereby corrected as shown below:

In the Claims

In Column 14, Claim 4, Line 7, delete "another;" and insert -- another, --, therefor.

In Column 14, Claim 5, Line 9, delete "axis;" and insert -- axis, --, therefor.

In Column 14, Claim 10, Line 24, delete "sample;" and insert -- sample, --, therefor.

In Column 14, Claim 10, Lines 31-32, delete "propagating;" and insert -- propagating, --, therefor.

In Column 14, Claim 10, Line 33, delete "holder;" and insert -- holder, --, therefor.

In Column 14, Claim 10, Line 34, delete "sensor;" and insert -- sensor, --, therefor.

In Column 14, Claim 10, Line 35, delete "sample;" and insert -- sample, --, therefor.

In Column 14, Claim 10, Line 54, delete "index;" and insert -- index, --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*